United States Patent
Wraight

(10) Patent No.: US 7,634,059 B2
(45) Date of Patent: Dec. 15, 2009

(54) DOWNHOLE IMAGING TOOL UTILIZING X-RAY GENERATOR

(75) Inventor: Peter Wraight, Skillman, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 16 days.

(21) Appl. No.: 11/950,469

(22) Filed: Dec. 5, 2007

(65) Prior Publication Data

US 2009/0147907 A1 Jun. 11, 2009

(51) Int. Cl.
*G01B 15/02* (2006.01)
*G01V 5/12* (2006.01)
(52) U.S. Cl. ........................... 378/89; 250/269.3
(58) Field of Classification Search .......... 378/57, 378/86–90, 59–60; 250/256, 260, 261, 264, 250/269.1–269.8
See application file for complete search history.

(56) References Cited

U.S. PATENT DOCUMENTS

| 5,680,431 A | 10/1997 | Pietras, III et al. |
| 5,910,654 A * | 6/1999 | Becker et al. ............ 250/269.3 |
| 2007/0041501 A1 | 2/2007 | Ramstad et al. |

* cited by examiner

*Primary Examiner*—Hoon Song
(74) *Attorney, Agent, or Firm*—Darla P. Fonseca; Jaime Castano

(57) ABSTRACT

An X-ray downhole imaging tool is provided and includes an X-ray tube capable of operating at least at 50 KeV and emitting at least one hundred micro-amperes of continuous electron current and a radiation detector axially displaced from the X-ray tube, at least partially shielded therefrom and radially directed. In certain embodiments, the radiation detector includes a microchannel plate and a resistive anode. In certain embodiments, a second detector which is axially directed is also provided.

20 Claims, 1 Drawing Sheet

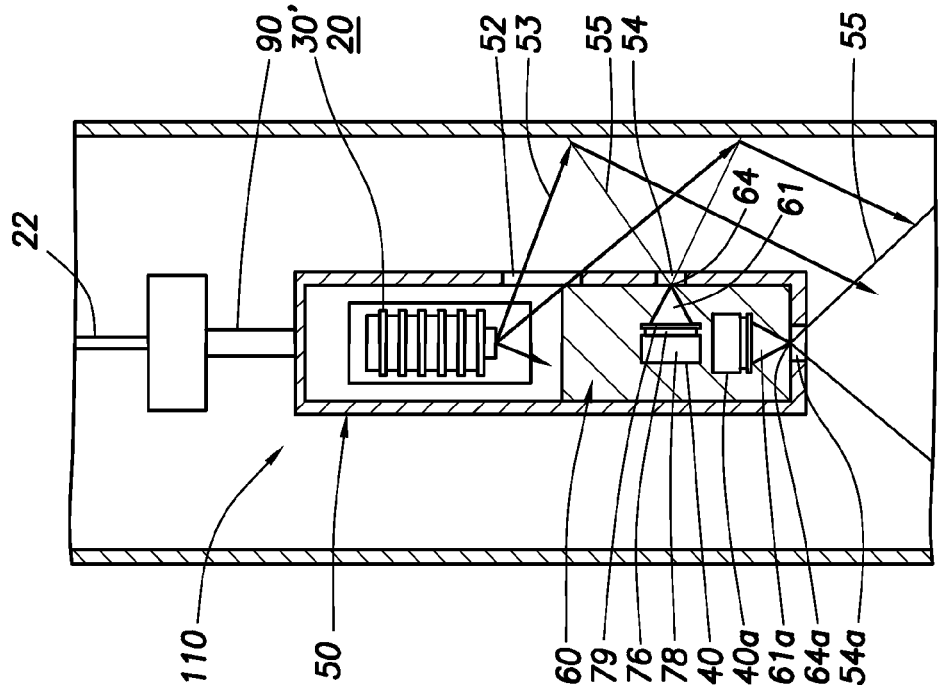
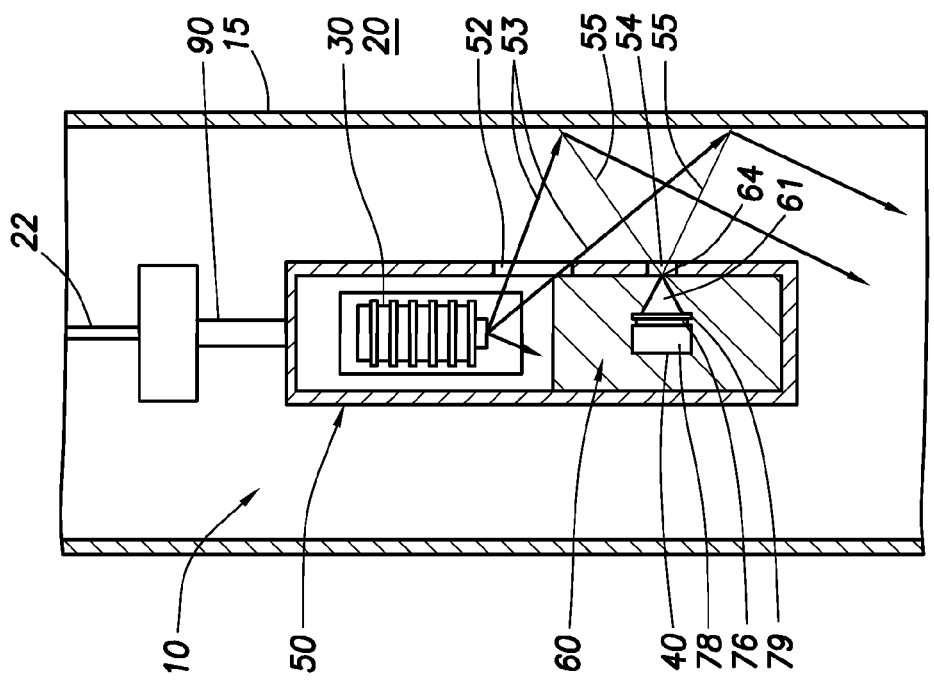

DOWNHOLE IMAGING TOOL UTILIZING X-RAY GENERATOR

BACKGROUND OF THE INVENTION

1. Field of the Invention

This invention relates broadly to tools for use in the hydrocarbon industry. More particularly, this invention relates to a downhole imaging tool utilizing an X-ray generator.

2. State of the Art

The use of radiation in the evaluation of geological formations is a well-established art. For example, a natural gamma ray logging tool has been used to detect the presence of naturally radioactive thorium, uranium and potassium in the formation in order to identify the lithology of the formation. Other logging tools utilizing radioactive sources such as $^{137}Cs$ have been used to make formation density measurements. While effective, logging tools utilizing radioactive sources have the downside that they are subject to extensive federal and/or state regulation involving their storage, transport, use, training, handling, monitoring, etc. If the gamma-ray source could be replaced by an X-ray source, then the radiation could be turned off when not in use, and transportation regulations applicable to radioactive materials would not apply.

Because X-ray tools are perceived as replacement for tools using radioactive sources, X-ray tools for downhole imaging of a formation or a wellbore have been the source of proposals and speculation for some time. An X-ray generator for such a tool is disclosed in co-owned U.S. Pat. No. 5,680,431 to Pietras, III et al. A block diagram of one such tool with a side-by-side X-ray source and detector is disclosed in US Publication No. 2007/0041501 to Ramstad which provides concept but no details of a workable embodiment. Despite the proposals and speculation, no commercial X-ray downhole imaging tool is available in the art because of the considerable obstacles posed by generating downhole suitable X-rays and by providing suitable downhole X-ray detectors capable of generating useful information.

SUMMARY OF THE INVENTION

According to one aspect of the invention, an X-ray downhole imaging tool is provided utilizing an X-ray source and detector which permit the tool to provide useful information, in one embodiment the X-ray downhole imaging tool includes an X-ray tube capable of emitting between 100 microamperes and 1 milliampere of continuous electron current at between 50 kV and 100 kV, a sideways looking radiation detector axially displaced from the X-ray tube, shielding which prevents photons emitted by the X-ray tube from directly reaching the radiation detector but which includes a pinhole camera for permitting photons deflected from outside the imaging tool to reach the detector, a housing which houses the X-ray tube, the radiation detector and the shielding, and a rotor which rotates the housing.

In a further embodiment, the X-ray downhole imaging tool includes an X-ray tube, a sideways looking radiation detector axially displaced from the X-ray tube, a downward looking radiation detector axially displaced from the X-ray tube, shielding which prevents photons emitted by the X-ray tube from directly reaching either radiation detector but which includes a radially directed pinhole camera and an axially downwardly directed pinhole camera for permitting photons deflected from outside the imaging tool to reach the detectors, a housing which houses the X-ray tube, the radiation detectors and the shielding, and a rotor which rotates the housing.

In another aspect of the invention, the radiation detector comprises a microchannel plate (MCP) and a resistive anode. Photons incident on the MCP result in a charge being deposited onto the resistive anode. The resistive anode has a plurality of output pins. Based on the relative charges on the pins, a determination can be made as to the location on the MCP that the photon was incident.

The X-ray downhole imaging tool preferably provides an image having at least 100×100 pixels, and can be used in both cased wells and uncased boreholes.

According to another aspect of the invention photons detected by the sideways looking detector are processed as a function of azimuth.

Additional advantages of the invention will become apparent to those skilled in the art upon reference to the detailed description taken in conjunction with the provided figures.

BRIEF DESCRIPTION OF THE DRAWINGS

FIG. 1 is a schematic of a first embodiment of an X-ray tool according to the invention.

FIG. 2 is a schematic of a second embodiment of an X-ray tool according to the invention.

DETAILED DESCRIPTION OF THE PREFERRED EMBODIMENTS

Turning now to FIG. 1, an X-ray tool 10 according to the invention is seen located in a cased well 15 traversing a formation 20. It will be appreciated by those skilled in the art that the X-ray tool 10 may be used in an uncased borehole, a cased borehole, a producing well, etc. In addition, the X-ray tool 10 is shown suspended by a cable 22, although it will be appreciated by those skilled in the art that the X-ray tool may be part of a drill string as in a logging-while-drilling (LWD) or measurement-while-drilling (MWD) arrangement, or suspended in the borehole or well in any other manner known in the art.

The X-ray tool 10 of the invention is provided with an X-ray tube 30 and at least one sideways looking photon detector 40 which are housed in a tool housing 50 which is rotated by a rotor 90. The tool housing 50 has a longitudinal axis, and the detector 40 is axially displaced from the X-ray tube 30. The tool housing 50 is preferably a high strength steel pressure housing which is provided with one or more boron carbide or beryllium windows 52 which permit low energy X-rays 53 to pass through the windows with little attenuation (i.e., the windows are substantially transparent). The window(s) 52 are preferably located along the housing between the X-ray tube 30 and the detector 40. The tool housing 50 is also provided with a second boron carbide or beryllium window(s) 54 adjacent the detector 40 as discussed below which is preferably axially below but radially aligned with the first window(s) 52 and which permit returning photons 55 to be detected.

The X-ray tube 30 is preferably substantially as disclosed in co-owned U.S. Ser. No. 11/611,441 filed on an even date herewith and hereby incorporated by reference herein in its entirety, although other X-ray tubes capable of generating a continuous electron current of at least 100 microamperes and operating at voltages of at least 50 kV may be used. More preferably, X-ray tubes capable of generating a continuous electron current of approximately 500 microamperes and operating at voltages of at least 100 kV are preferred. The X-ray tube of U.S. Ser. No. 11/611,441 utilizes a dispenser cathode electron source capable of emitting several milliamperes of continuous electron current and a target sufficiently thick to stop all 200 keV electrons. More particularly, X-ray tube 30 has a target at +200 kV and an electron source at −200 kV. The target is a 5 mil (127 micron) thick gold (Au) target. A grid operating at on the order of +200V relative to the cathode is provided for electron current control and for focusing the electron beam along the axis of the X-ray tube. A very large radiation flux is generated at lower energies. This low energy radiation does not contribute to an ultimate signal, but can damage the X-ray tube and surrounding elements. Thus, as disclosed in co-owned U.S. Ser. No. 11/611,441, the X-ray tube 30 is preferably provided with radial shielding to reduce emission of all radiation except in the solid angle defined by collimators directed out of the tool into the formation via window 52.

Shielding 60 is provided between the X-ray tube and the detector 40. This shielding is provided to prevent radiation from the X-ray tube from reaching the detector 40 without exiting the tool 10. The shielding 60 is preferably a block of tungsten which includes cut-outs 63 (i.e., defines one or more cavities) for the detector 40 and associated circuitry (not shown), and also defines a conical radially (sideways) directed hollow or chamber (camera obscura) 61 which terminates in a pinhole aperture 64 adjacent housing window 54. The pinhole aperture 64 is preferably between 0.1 and 1 mm in diameter, and more preferably approximately 0.5 mm in diameter.

In one embodiment, detector 40 is a high resolution detector and includes a microchannel plate (MCP) 76 and a resistive anode 78. The microchannel plate 76 is effectively an array of micro-electron-multipliers oriented parallel to one another, such that a photon incident on one end of a channel will result in multiple electrons being generated at the other end of that channel. The MCP is formed from glass with thousands of micron-diameter channels per square inch having a large length to diameter ratio (e.g., 40-100) and is typically provided in a vacuum sealed environment with a beryllium window 79 sealed over the channels. A suitable microchannel plate for the detector of the invention is a microchannel plate of Burle, Inc., Ohio. A suitable microchannel plate for the detector of the invention include microchannel plates of Burle, Inc., Ohio, or Hamamatsu. The resistive anode 78 coupled to the microchannel plate is also available from Burle or Hamamatsu and is typically a one inch by one inch plate having four output pins, wherein the relative charge on the pins is indicative of the location (i.e., the microchannel) at which a photon was detected. Thus, the side-wise oriented detector 40 is capable of imaging an area of the borehole or well adjacent the housing window 54 with desired resolution (e.g., at least 100×100 pixels). Because the X-rays are not reflected by oil or water in the borehole or well, typically, the image will be of the wall of the borehole or the casing of a well. In addition, because the tool housing 50 is being rotated by rotor 90, the pinhole camera 61 is rotating. Thus, by tracking the location of the camera as the housing 50 rotates, a 360 degree scan of the borehole/formation can be obtained.

The resistive anode 78 of the detector is coupled to circuitry (not shown) which reads the charge on the pins of the anode and generates a signal indicative of the location (i.e., the microchannel) at which a photon was incident in order to generate a pixel value. The circuitry may be located in another cavity in the tungsten shielding 60 or elsewhere downhole in tool. The signal generated by the circuitry is sent uphole by wireline or in other manners well known in the art. Regardless, wires (not shown) from the anode pins are preferably snaked through the tungsten shielding 60 so that no direct path is available for photons to reach the anode or MCP via the wire paths.

Rotor 90 which rotates the housing 50 may take any of many forms. As an example, the rotor 90 may be part of a motor having bearings (not shown) and/or gears (not shown). Preferably, means (not shown) are provided for sensing the rotational orientation of the rotor and housing. This rotational orientation information is preferably stored in conjunction with the image signals obtained by the detector 40.

Turning now to FIG. 2, an X-ray tool 110 according to a second embodiment of the invention is seen. Tool 110 is similar in most respects to tool 10 of FIG. 1 (and like parts are shown with the same numbering notation), except that (i) a second downward looking detector 40*a* is provided; (ii) housing 50 is provided with a third boron carbide or beryllium window 54*a*; and (iii) the shielding 60 is provided with appropriate cavities for the detector 40*a* and associated circuitry (not shown) and further defines a conical axially (downwards) directed chamber 61*a* which terminates in a pinhole aperture 64*a* adjacent housing window 54*a*. In addition, it should be appreciated that in order to receive a signal in the downwardly looking detector 40*a*, a larger signal from the X-ray tube which is more widely scattered is desirable. Thus, the X-ray tube 30' of the embodiment of FIG. 2 is modified (relative to X-ray tube 30) to eliminate certain radial shielding and collimators which would otherwise reduce emission of all radiation except in a defined solid angle. In this manner, high energy X-rays will exit the housing 50 in all directions (while lower energy X-rays will still only pass through the housing via window(s) 52), and a signal is more likely to be picked up through window 54*a*. It is noted that the detector 40*a* is preferably identical to detector 40 except that it is oriented parallel to or coaxial with the axis of the X-ray tube 30.

The tools 10, 110 of the invention are versatile and can be used for various applications. In particular, because the amount of X-ray scattering is closely related to the density of the material surrounding the tool, the tools 10, 110 can be used to provide an indication of the density of the formation surrounding the borehole. In addition, the tools 10, 110 can be used to evaluate the granularity and vug structure of a carbonate reservoir. Where the borehole is lined, the tools 10, 110 can be used to check the packing behind the liner screen. Where the borehole is cased, tools 10, 110 can be used to investigate pitting in the casing, as well as to visually examine perforations, positions of flow valve actuators, and mechanical connections to side tracks. Because of its axial second detector, tool 110 is particularly adapted to visually examining debris which might have fallen into a borehole that needs to be "fished", or other mechanical downhole hardware which was inadvertently lost in the cased borehole. Tools 10, 110 can also be placed on a drill string and can be used to image the formation during drilling and/or during tripping of the tool into and out of the formation.

According to another aspect of the invention, methods are provided for investigating a borehole and/or material surrounding the borehole. According to the methods, an X-ray imaging tool as described above with respect to FIGS. 1 and 2 is placed into the borehole (or cased well 15) in the formation 20. Using signals from surface equipment (not shown), the X-ray tube 30 is activated such that X-rays of a desired energy range are directed out of the X-ray tool 10, 110 and into the borehole and/or formation. Some X-rays scattered outside the X-ray tool 10, 110 are detected by one or more detectors of the X-ray tool 10, 110. The information detected by the detectors is stored in the tool 10, 110 and/or is forwarded to the surface for processing. Real time images can be obtained. In addition, or as an alternative, a log of information as a function of borehole distance (depth) can be obtained. In a preferred aspect of the invention, the sideways looking detector obtains information as a function of azimuth (rotational location) and that information can be displayed in real time or as a log.

There have been described and illustrated herein embodiments of an X-ray tool and a method of its use. While particular embodiments of the invention have been described, it is not intended that the invention be limited thereto, as it is intended that the invention be as broad in scope as the art will allow and that the specification be read likewise. Thus, while a particular type photon detector which utilizes a multichannel plate and a resistive anode has been disclosed, it will be appreciated that other detectors can be utilized provided that a quality image is obtained. Also, while a particular X-ray tube has been described, it will be appreciated that other X-ray generators could be utilized. Further, while particular materials such as steel and tungsten which highly attenuate X-rays generated by the X-ray tube were described for the housing and shielding, it will be appreciated that other such highly attenuating materials could be utilized. Similarly, while materials such as boron carbide and beryllium were described for use as windows in the housing for permitting low energy X-rays and returning photons to pass therethrough, it will be appreciated that other high strength, substantially transparent materials could be utilized. In addition, while a chamber having a pinpoint aperture was described as being provided in the detector shielding, it will be appreciated that the chamber could be filled with a material (e.g., boron carbide, beryllium, glass, etc.) which is substantially transparent to the returning photons.

It will also be recognized by those skilled in the art that while the X-ray tool has been described as having an X-ray tube above the detector(s), the tube and detector locations could be reversed, provided that they are axially displaced from each other. In addition while a rotor has been described as a rotation means for rotating the housing and camera of the tool, it will be appreciated that in LWD tools, at least portions of the drill string will already be rotating. Therefore, in LWD situations, the tool of the invention may be incorporated in a rotation portion of the drill string such that the means for rotating is provided by the means for rotating the drill (string). It will therefore be appreciated by those skilled in the art that yet other modifications could be made to the provided invention without deviating from its spirit and scope as claimed.

What is claimed is:

1. A downhole tool for use in a borehole or well, comprising:
   a) a housing having a longitudinal axis;
   b) an X-ray source located in said housing, said X-ray source including an X-ray tube which generates X-rays capable of exiting said housing;
   c) a photon detector located in said housing and axially displaced from said X-ray source relative to said longitudinal axis, said photon detector comprising a microchannel plate and an anode coupled to said microchannel plate;
   d) shielding between said X-ray source and said photon detector, said shielding substantially blocking X-rays from directly reaching said detector from said X-ray source, said shielding defining a cavity for said photon detector and conical chamber adjacent said cavity, said conical chamber terminating in a radially directed pinhole through which X-rays generated by said X-ray source and scattered outside of said housing can reach said photon detector, said conical chamber and said pinhole configured to function as a camera obscura; and
   e) means for rotating said housing so as to cause said radially directed pinhole to face different azimuthal directions.

2. A downhole tool according to claim 1, wherein:
said anode is a resistive anode having a plurality of output pins.

3. A downhole tool according to claim 1, further comprising:
means for identifying the azimuthal location of said housing.

4. A downhole tool according to claim 1, wherein:
said housing includes a first window adjacent said pinhole which is substantially transparent to photons returning from the borehole or well.

5. A downhole tool according to claim 4, wherein:
said window comprises boron carbide or beryllium.

6. A downhole tool according to claim 4, wherein:
said housing includes a second window radially aligned with said first window, said second window being substantially transparent to low energy X-rays generated by said X-ray source.

7. A downhole tool according to claim 4, wherein:
said second window is located between said X-ray source and said detector.

8. A downhole tool according to claim 1, wherein:
said source emits at least 100 microamperes and operates at least 50 kV.

9. A downhole tool according to claim 1, further comprising:
a second photon detector located in said housing and shielded by said shielding which blocks X-rays generated by said X-ray source from directly reaching said second detector.

10. A downhole tool according to claim 1, wherein:
said shielding defines a second cavity for said second photon detector and a second conical chamber adjacent said second cavity, said second conical chamber terminating in a second pinhole through which X-rays generated by said X-ray source and scattered outside of said housing can reach said second photon detector.

11. A downhole tool according to claim 10, wherein:
said second conical chamber and second pinhole are axially directed and parallel to said longitudinal axis.

12. A downhole tool according to claim 11, wherein:
said housing includes a first window adjacent said radially directed pinhole which is substantially transparent to photons returning from the borehole or well and a second window adjacent said axially directed pinhole which is substantially transparent to photons returning from the borehole or well.

13. A downhole tool for use in a borehole or well, comprising:
   a) a housing having a longitudinal axis;
   b) an X-ray source located in said housing, said X-ray source including an X-ray tube emitting at least 100 microamperes and operates at least 50 kV and generating X-rays capable of exiting said housing;
   c) a photon detector located in said housing and axially displaced from said X-ray source relative to said longitudinal axis;
   d) shielding between said X-ray source and said photon detector, said shielding substantially blocking X-rays from directly reaching said detector from said X-ray source, said shielding defining a cavity for said photon detector and conical chamber adjacent said cavity, said conical chamber terminating in a radially directed pinhole through which X-rays generated by said X-ray source and scattered outside of said housing can reach said photon detector, said conical chamber and said pinhole configured to function as a camera obscura; and e) means for rotating said housing so as to cause said radially directed pinhole to face different azimuthal directions.

14. A downhole tool according to claim 13, wherein:
said photon detector comprises a microchannel plate and a resistive anode coupled to said microchannel plate.

15. A downhole tool according to claim 14, wherein:
said housing includes a first window adjacent said pinhole which is substantially transparent to photons returning from the borehole or well, and a second window located between said X-ray source and said detector and radially aligned with said first window, said second window being substantially transparent to low energy X-rays generated by said X-ray source.

16. A downhole tool according to claim 14, further comprising:
a second photon detector located in said housing and shielded by said shielding which blocks X-rays generated by said X-ray source from directly reaching said second detector, wherein said shielding defines a second cavity for said second photon detector and a second conical chamber adjacent said second cavity, said second conical chamber terminating in a second pinhole through which X-rays generated by said X-ray source and scattered outside of said housing can reach said second photon detector, said second conical chamber and second pinhole being axially directed and parallel to said longitudinal axis.

17. A downhole tool for use in a borehole or well, comprising:
a) a housing having a longitudinal axis;
b) an X-ray source located in said housing, said X-ray source including an X-ray tube emitting at least 100 microamperes and operates at least 50 kV and generating X-rays capable of exiting said housing;
c) a photon detector located in said housing and axially displaced from said X-ray source relative to said longitudinal axis, said photon detector capable of providing information with a resolution of 100×100 pixels;
d) shielding between said X-ray source and said photon detector, said shielding substantially blocking X-rays from directly reaching said detector from said X-ray source, said shielding defining a cavity for said photon detector and conical chamber adjacent said cavity, said conical chamber terminating in a radially directed pinhole through which X-rays generated by said X-ray source and scattered outside of said housing can reach said photon detector, said conical chamber and said pinhole configured to function as a camera obscura; and
e) means for rotating said housing so as to cause said radially directed pinhole to face different azimuthal directions.

18. A downhole tool according to claim 13, wherein:
said photon detector comprises a microchannel plate and a resistive anode coupled to said microchannel plate.

19. A downhole tool according to claim 18, wherein:
said housing includes a first window adjacent said pinhole which is substantially transparent to photons returning from the borehole or well, and a second window located between said X-ray source and said detector and radially aligned with said first window, said second window being substantially transparent to low energy X-rays generated by said X-ray source.

20. A downhole tool according to claim 19, further comprising:
a second photon detector located in said housing and shielded by said shielding which blocks X-rays generated by said X-ray source from directly reaching said second detector, wherein said shielding defines a second cavity for said second photon detector and a second conical chamber adjacent said second cavity, said second conical chamber terminating in a second pinhole through which X-rays generated by said X-ray source and scattered outside of said housing can reach said second photon detector, said second conical chamber and second pinhole being axially directed and parallel to said longitudinal axis.

* * * * *